United States Patent [19]

Kranz

[11] 4,244,146
[45] Jan. 13, 1981

[54] REVOLVING GREENHOUSE

[76] Inventor: Dale P. Kranz, 633 E. 73rd St., Kansas City, Mo. 64131

[21] Appl. No.: 59,956

[22] Filed: Jul. 23, 1979

[51] Int. Cl.³ ............................ A01G 9/14; G02F 1/30
[52] U.S. Cl. ............................................ 47/17; 52/66; 47/18
[58] Field of Search .................... 52/66; 47/17, 65, 18, 47/14

[56] References Cited

U.S. PATENT DOCUMENTS

| | | | |
|---|---|---|---|
| 3,741,631 | 6/1973 | Laing | 47/17 X |
| 3,749,332 | 7/1973 | Gray | 47/17 X |
| 3,911,619 | 10/1975 | Dedolph | 47/14 |
| 4,109,395 | 8/1978 | Huang | 47/65 |
| 4,184,479 | 1/1980 | Ratliff | 47/17 X |

Primary Examiner—Robert E. Bagwill
Attorney, Agent, or Firm—Shoemaker and Mattare, Ltd.

[57] ABSTRACT

A greenhouse includes a hollow cylinder which is revolvably mounted. The cylinder includes an opaque portion and a translucent portion and is revolved to control the amount of sunlight entering the cylinder from any given direction, and insulate the growing area when needed. Alternative embodiments include a pair of concentric cylinders.

16 Claims, 16 Drawing Figures

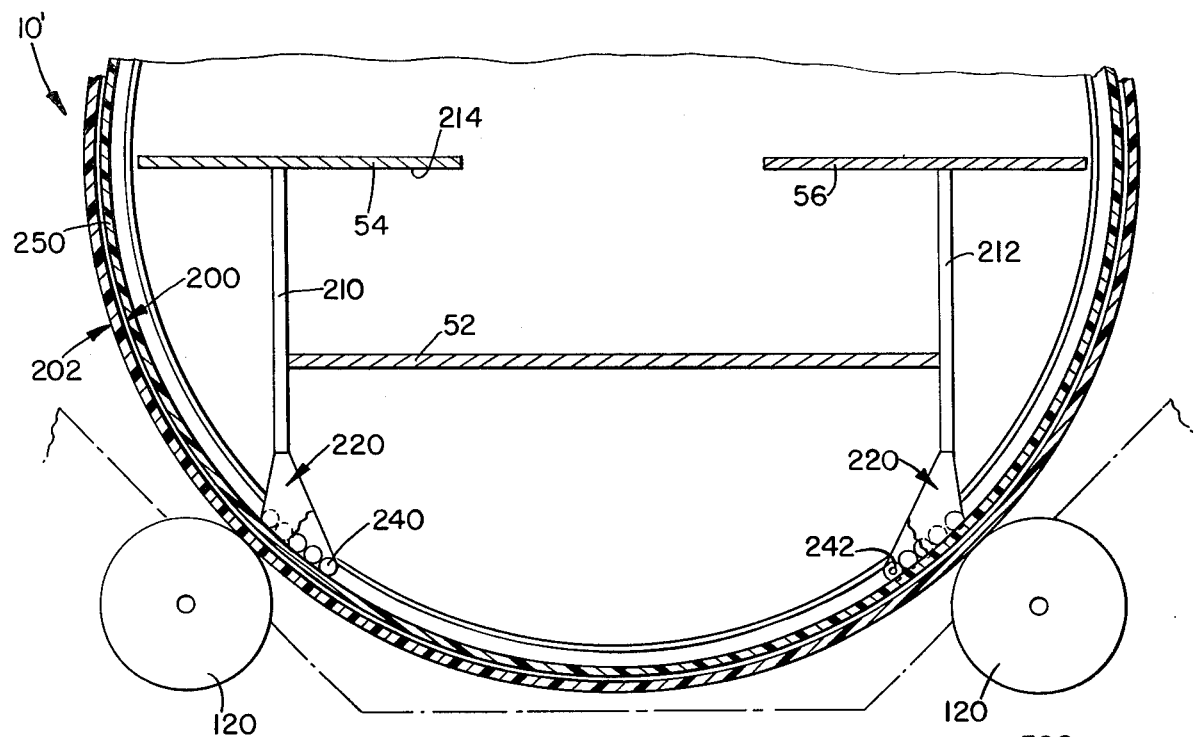
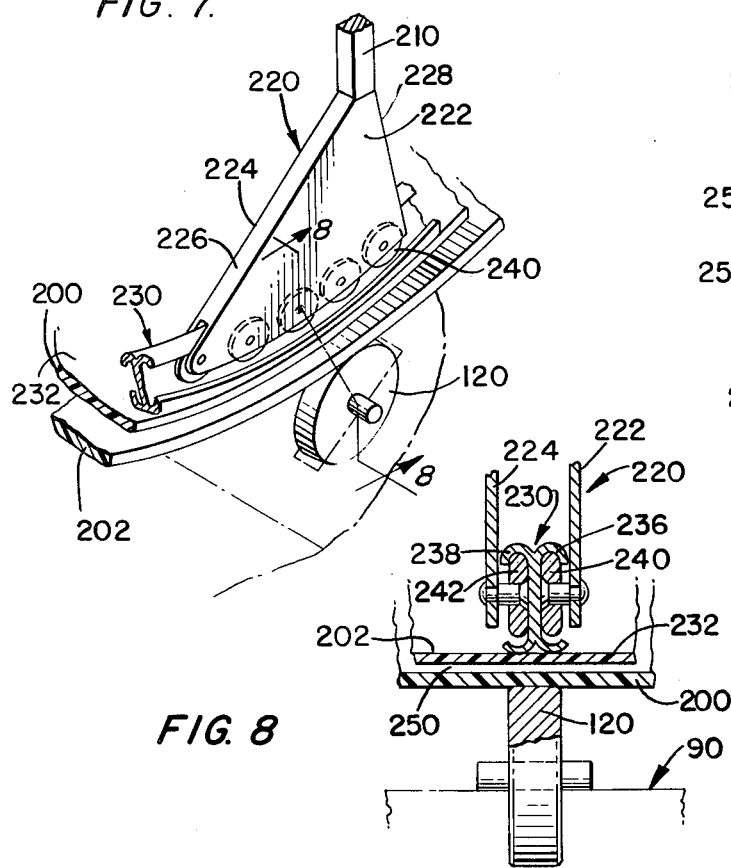
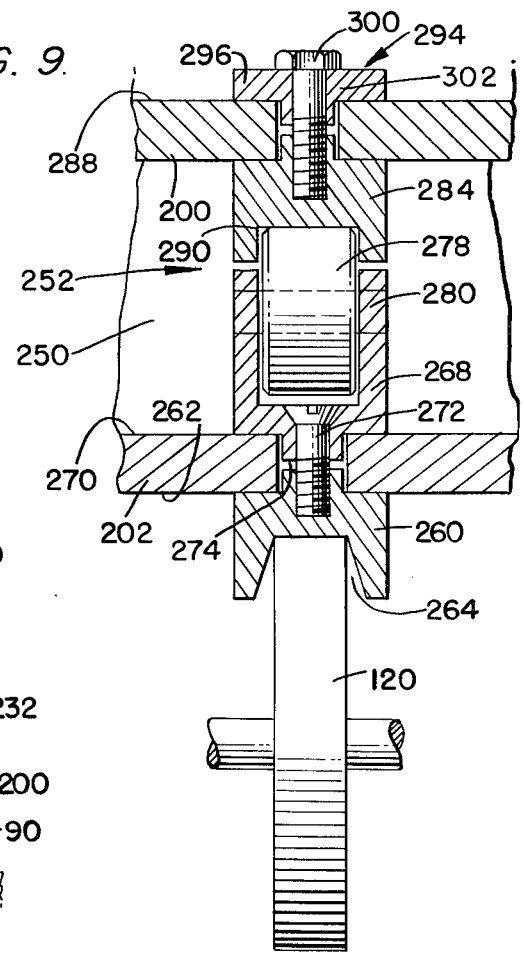

REVOLVING GREENHOUSE

BACKGROUND OF THE INVENTION

The present invention relates in general to floriculture, and, more particularly, to greenhouses, and other shelters. Proper conditions are imperative for growing plants. Such conditions include proper temperature, proper humidity and proper sunlight. The sunlight requirements include not only quantity but direction and time of day.

Greenhouses are well known devices for providing excellent growing conditions for plants. Examples of greenhouses are disclosed in U.S. Pat. Nos. 4,014,133, 4,064,648 and 4,068,423. However, these structures suffer several deficiencies. For example, heavy snow loads, or heavy hail storms, may severely damage, if not destroy, these structures. Furthermore, these devices do not efficiently shield the interiors thereof from direct rays of spring sun.

Environmental conditions within a greenhouse have been the subject of some developmental work. Examples of devices used to regulate the environmental conditions within greenhouses are disclosed in U.S. Pat. Nos. 3,294,150, 4,062,146, 4,067,347 and 4,108,373. However, these devices also do not efficiently handle snow loads, if such loading is handled at all. In fact, no greenhouse-type device known to the present inventor efficiently handles snow loading.

Accordingly, there is need for a greenhouse which provides precise control over the amount of sunlight entering the structure from any given direction as well as a greenhouse which efficiently handles snow and hail loading.

Furthermore, present methods of regulating photoperiodism require using a black cloth which is pulled over the plants. This method builds up heat under the cloth, and reduces the quality of the crop.

Thus, there is need for a greenhouse in which photoperiodism can be regulated without reducing the quality of the crop due to heat buildup.

SUMMARY OF THE INVENTION

The greenhouse of the present invention permits precise control over the amount of sunlight entering the structure from any given direction and can efficiently handle snow and hail loading, as well as high winds or the like. The greenhouse embodying the teachings of the present invention conserves heat by insulating the growing area during periods of darkness, and further conserves energy by insulating the growing area during photoperiodism.

The greenhouse includes an outer hollow cylindrical structure oriented to have the longitudinal axis thereof essentially horizontal. A plurality of benches and a walkway are located within the cylinder. The cylinder is mounted to be revolvable about the longitudinal center axis thereof, and a portion of the lateral surface thereof is translucent, while the remaining portion of the lateral surface is opaque. The lateral surface can be divided to have several opaque sections interposed between several translucent sections, or other such configuration.

By revolving the cylinder, the translucent portion of the cylinder can be presented to permit the entry of sunlight into the greenhouse. By further revolving the cylinder, the greenhouse can be "closed", that is, the opaque material oriented so that sunlight is prevented from entering the greenhouse. The opaque portion can be insulation, and thus control over the internal temperature of the greenhouse can be exerted.

Snow can be easily removed from the greenhouse by revolving the cylinder, and the opaque portion can be presented into a direction from which hail or the like is falling to further protect the greenhouse.

An alternative embodiment of the greenhouse includes an inner cylinder concentric with the outer cylinder. Both cylinders can have opaque and translucent portions of the same or different material, or the inner cylinder can have an open portion so that by orienting the cylinders with respect to each other, even further control over the sunlight entering the greenhouse can be exerted.

Benches and walkways are located within the cylinder to extend longitudinally thereof. The benches support the plants, and the walkways are used for access to those plants.

End closures are stationary and close the ends of the cylinders. A doorway is defined in one of the end closures to permit access and egress from the greenhouse interior.

The greenhouse can be situated on the ground in a lined pit, or on a roof of a building. A plurality of greenhouse cylinders can be located side by side with the longitudinal centerlines thereof parallel to provide further growing facilities. The presently disclosed greenhouse thus: insulates the growing area at night, insulates the growing area during the day from north winds, provides photoperiodism (less than 10 foot candles), provides photoperiodism insulated, protects translucent skin from hail, removes snow load, provides shield from direct rays of spring sun and provides security from rocks thrown at night or other such acts of vandalism.

Thus, using the greenhouse disclosed herein, a grower can regulate the interior environment of the greenhouse within very precise limits.

In the presently disclosed structure, photoperiodism can be regulated by closing the structure at 5:00 p.m. and opening it at 8:00 a.m. The structure provides an insulated area which can be air conditioned to ensure quality growth.

The greenhouse of the present invention can be closed at dusk and provide an insulated area which can conserve heat in the winter.

In early spring, the greenhouse can be arranged to prevent direct rays of the sun from burning young seedlings and cuttings which have not yet established.

During winter, the greenhouse of the present invention can be arranged to allow the rays of the sun to enter, while the cold north winds can be repelled.

During heavy snows, the greenhouse can revolve, thereby removing heavy snowloads.

The insulated portion of the cylinder can be exposed during hailstorms, thus protecting the more vulnerable translucent portions of the cylinder.

It is also noted that the greenhouse disclosed herein can also be used as a shelter for animals, men, or the like if so desired.

To conserve energy the greenhouse insulates the growing area when needed. Preventing heat from escaping the roof conserves energy and makes the greenhouse quite energy efficient.

OBJECTS OF THE INVENTION

It is, therefore, a main object of the present invention to control the amount of sunlight entering a greenhouse from any given direction.

It is a further object of the present invention to insulate the growing area when necessary.

It is another object of the present invention to provide a greenhouse which efficiently handles snowloads.

It is yet another object of the present invention to provide a greenhouse with a shield against direct rays of spring sun.

It is still another object of the present invention to protect a greenhouse against vandalism.

These together with other objects and advantages which will become subsequently apparent reside in the details of construction and operation as more fully hereinafter described and claimed, reference being had to the accompanying drawings forming part hereof, wherein like reference numerals refer to like parts throughout.

BRIEF DESCRIPTION OF THE DRAWINGS

FIG. 6 is a partial elevation view of an alternative embodiment of a greenhouse embodying the teachings of the present invention.

FIG. 7 is a perspective of a portion of the greenhouse shown in FIG. 6.

FIG. 8 is a view taken along line 8—8 of FIG. 7.

FIG. 9 is a alternative embodiment of the greenhouse shown in FIG. 6.

DETAILED DESCRIPTION OF THE INVENTION

Figure 1:
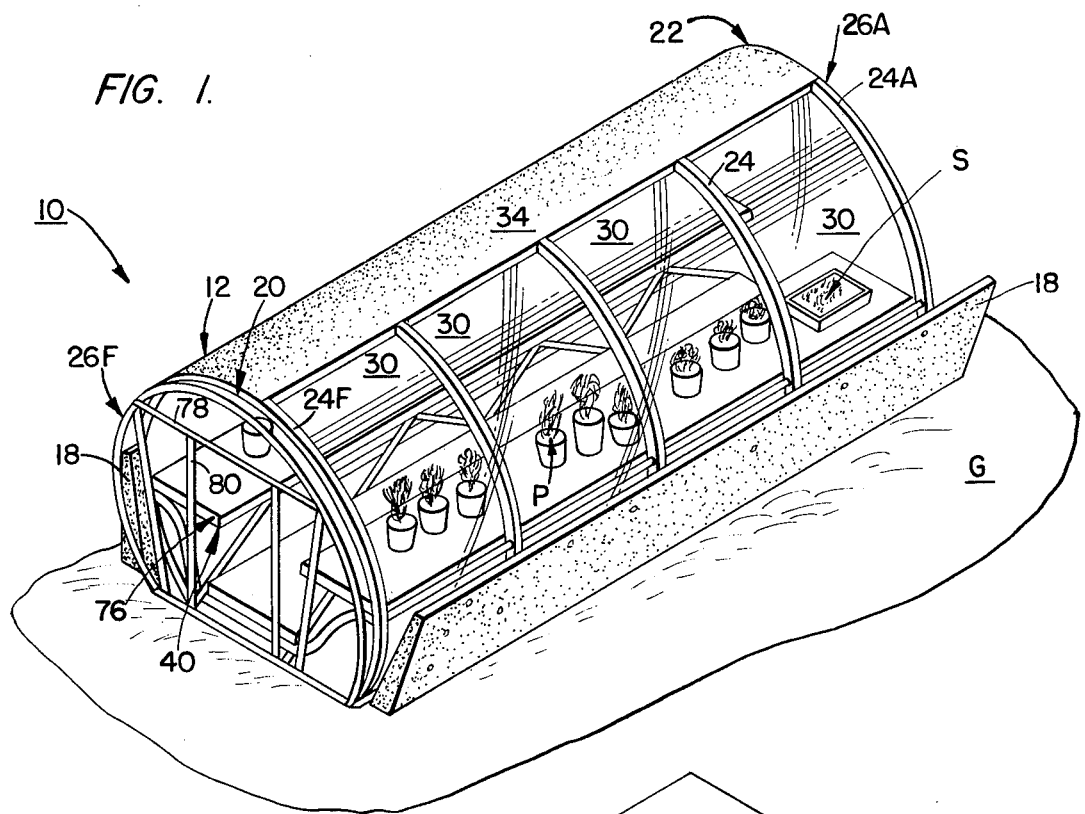
FIG. 1 is a perspective showing a greenhouse embodying the teachings of the present invention.

Shown in FIG. 1 is a greenhouse 10 which includes an outer cylinder 12 and which has a regulated environment in the interior section thereof. Preferably this regulated environment is used in greenhouse-type situations for growing plants P, seedlings S, or the like.

Figure 3:
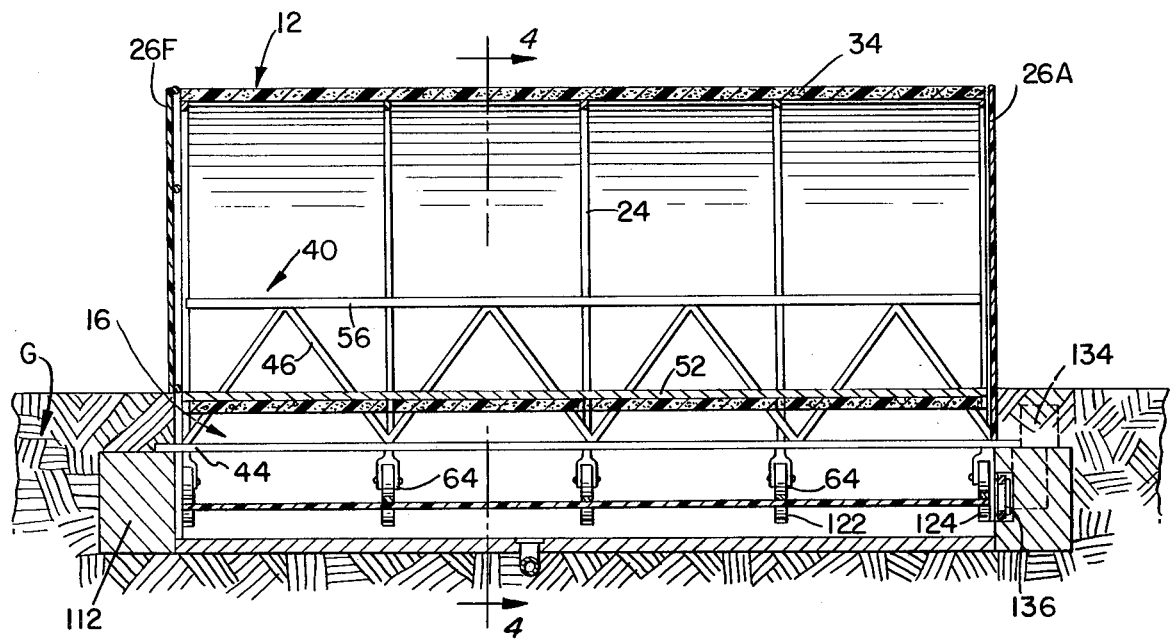
FIG. 3 is a side elevation view of the greenhouse embodying the teachings of the present invention.

As shown in FIGS. 1 and 3, the cylinder 12 is located in a pit 16 defined in the ground G. The pit includes footings, drains, foundations and the like. Protective wings 18, formed of concrete or the like, are located adjacent the pit to extend upwardly at an angle from surface GS. The cylinder 12 has a fore end 20 and an aft end 22. A plurality of ribs 24 form a plurality of support ribs, with ribs 24F and 24A forming fore and aft ribs respectively. The ends of the cylinder are open and are sealingly covered by stationary fore and aft end covers 26F and 26A, respectively. The stationary end covers are circular in peripheral shape, and, in the preferred embodiment, are mounted to be independent of the cylinder and to be stationary.

A plurality of translucent panels 30 are supported by the ribs 24, and in one embodiment, extend for approximately 180°, or one half of the circumference of the cylinder 12. An opaque material, such as insulation 34, is also supported by the ribs and covers the remainder of the outer circumference of the cylinder 12. Thus, one half of the cylinder outer circumferential lateral surface includes translucent material and the other half of the cylinder lateral surface includes opaque material. The significance of such structure will be explained hereinafter.

Figure 2:
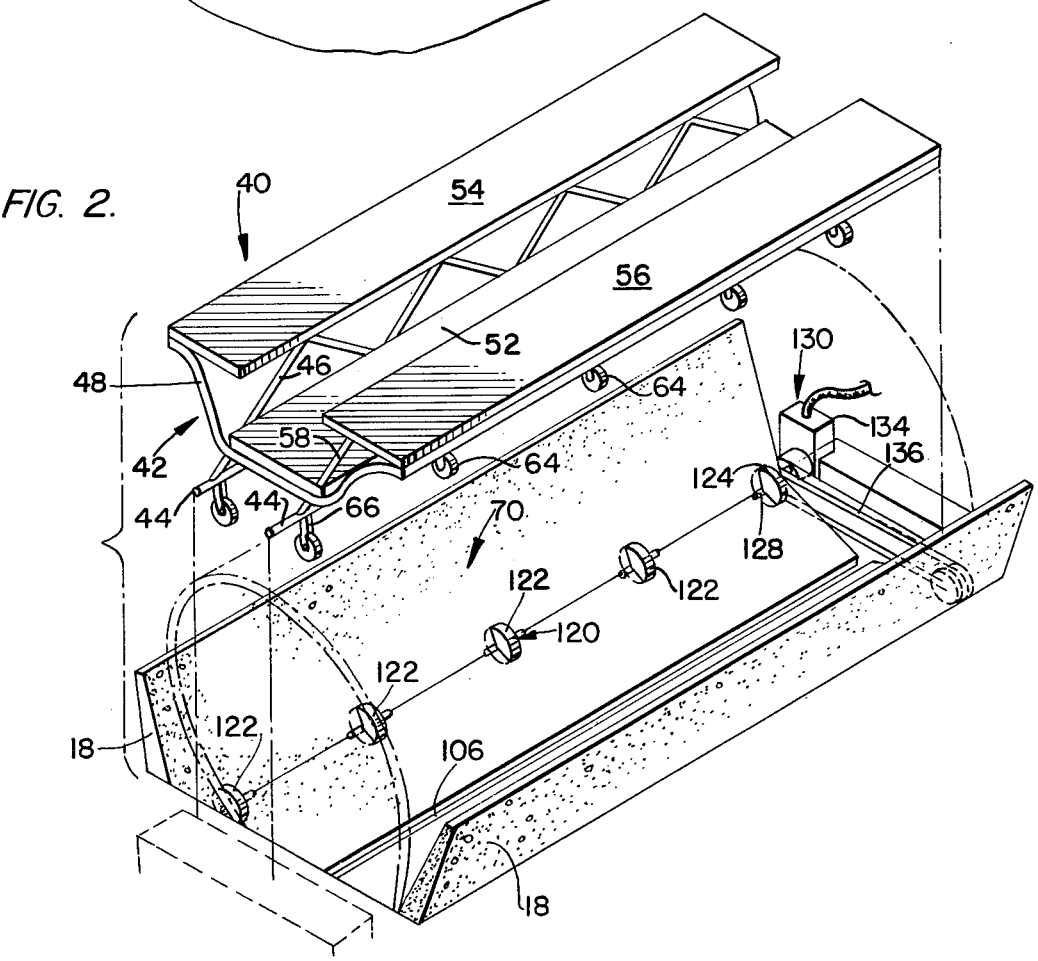
FIG. 2 is an exploded perspective showing the greenhouse embodying the teachings of the present invention.
Figure 4:
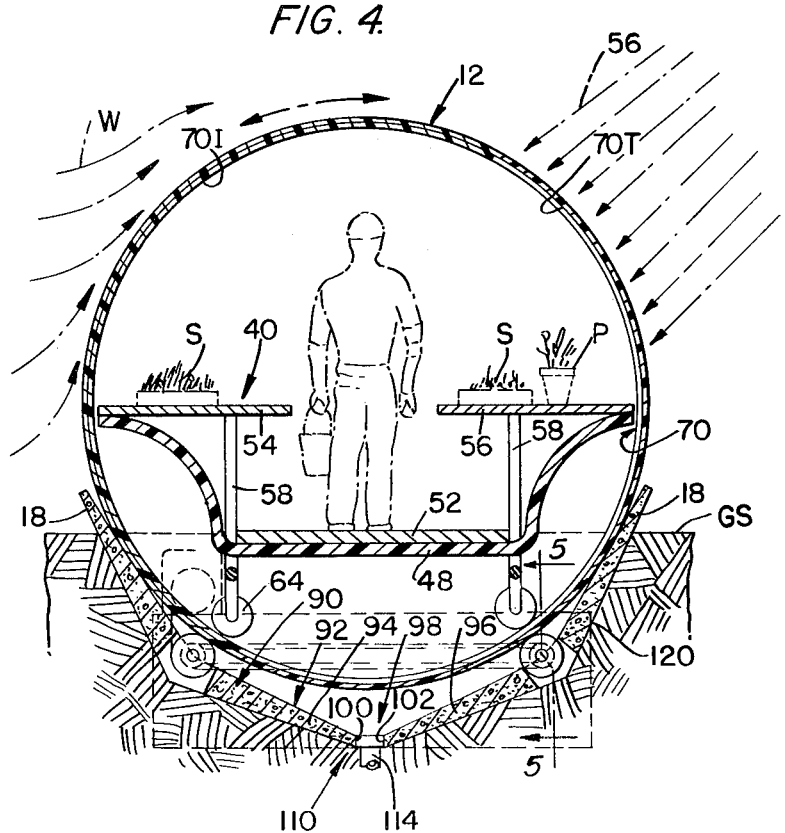
FIG. 4 is a view taken along line 4—4 of FIG. 3.
Figure 5:
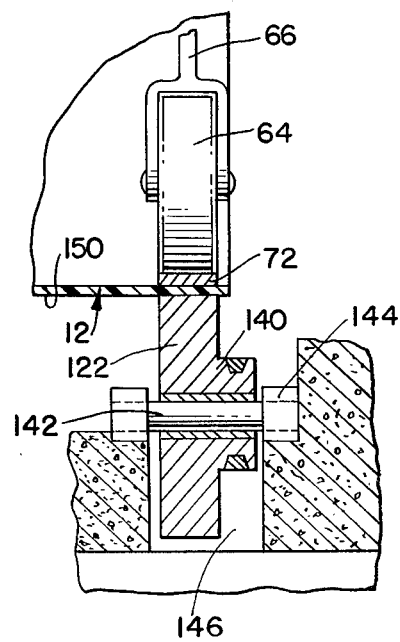
FIG. 5 is a view taken along line 5—5 of FIG. 4.

A support structure 40 is located in the house interior and is best shown in FIGS. 1 and 2. The support structure includes a framework 42 having a pair of coextensive, parallel truss bars 44 mounting thereon support braces 46 and end braces 48. An elongate walkway 52 and a pair of elongate parallel coplanar benches 54 and 56 are supported on the cross braces and end braces to transversely extend toward each other and toward the walkway so that the walkway is centrally located between the benches. A plurality of bench braces 58 are mounted on the walkway to support inner longitudinal edges 60 of the benches. Access to these benches from the central walkway is thus easy, as indicated in FIG. 4. A plurality of trundle-type wheels 64 are mounted by legs 66 to depend from the truss bars 44. The wheels 64 are mounted with the axes thereof parallel to the truss bars so that the support structure is not movable on the wheels 64 and the cylinder is movable relative to the support structure in a direction transverse of the benches and walkway. In one embodiment, the wheels 64 ride on the inner surface 70 of the cylinder 12, and thus ride on the inner surfaces 70T and 70I of the translucent and opaque sections, respectively. These sections can be formed of hard materials, or can have protective coatings thereon, such as plastics type material to prevent damage thereto by the wheels. This is especially important in the case of the insulation. A protective strip 72 is shown in FIG. 5 and can extend completely around the inner circumference of the greenhouse or partly therearound if desired, or can be located only on the insulation, or the like. The strip can include frictional material to facilitate proper movement of the wheels on that strip. It is noted that wheels 64 have the function of preventing the cylinder 12 from lifting due to wind updrafts. The wheels 64 can be in contact with inner surfaces 70T and 70I but do not ride on them constantly.

Access to the interior of the cylinder 12 is via an access door 76 defined in fore end 20 by horizontal door frame member 78 and upright door frame member 80. The end members 20 and 22 can be either opaque or translucent material.

As best shown in FIGS. 2, 3 and 4, a liner 90 is located in the pit 16. The liner is preferably concrete and includes the aforementioned wings 18 and a base section 92 which includes a pair of downwardly converging side sections 94 and 96. As shown in FIG. 4, the liner sides thus form V-shapes and have apex sections 98. The side sections have adjacent edges 100 and 102 spaced apart to define an elongate trough 106 which serves as a drain for the greenhouse 10. A sump 110 is located in the drain and includes a drain pipe 114 for conducting water collected in the drain away from the greenhouse to a suitable collection means (not shown). Footings 112 are located adjacent each end of the cylinder and serve to anchor that structure in the ground.

As shown in FIGS. 2, 4 and 5, a plurality of support rollers 120 are mounted in the liner 90 and rotatably support the greenhouse cylinder 12 from beneath that cylinder. As shown in FIG. 2, the rollers includes idler rollers 122 and drive rollers 124. The drive rollers are preferably located adjacent aft end 22 and include drive shafts 128 drivingly connected to a drive mechanism 130 by suitable means, such as drive pulleys or the like. The drive mechanism includes a motor 134 mounted in the ground adjacent the aft end of the greenhouse cylinder as best shown in FIGS. 2 and 3. The motor is connected to a drive chain or belt 136 via drive pulleys or the like to drive that belt in a circular motion. The drive belt is connected to the greenhouse cylinder drive rollers to transmit rotation to those rollers. Gear reducers, brakes and other equipment can be included with the drive mechanism. The motor can be electrically driven or can be driven by any other suitable means, such as an internal combustion mechanism or the like. Suitably timing mechanisms can be included to actuate the motor for given lengths of time at suitable intervals. The timing mechanisms can be controlled by appropriate programs determined according to the cycles desired in the greenhouse, as will be apparent from the ensuing discussion.

An idler roller is shown in FIG. 5 and includes a boss section 140 and an axle 142 positioned therein. The axle is mounted in bearings and bearing supports 144 which are mounted on the liner adjacent a wheel receiving opening 146 defined in the linear at or adjacent the apex sections thereof. The roller contacts outer surface 150 of the greenhouse cylinder 12 and supports that cylinder.

Operation of the greenhouse is seen by referring to FIGS. 1-4. The greenhouse can be oriented to present the translucent portion sideways, that is, as shown in FIG. 1 with the translucent portion extending from the 12:00 position to the 6:00 position, and the opaque portion extending from the 6:00 position to the 12:00 position. Such an orientation will provide sunlight to the material located adjacent the translucent portion in a directed manner as indicated by arrows SL in FIG. 4. The greenhouse cylinder can be rotated 180° so that the opaque portion is located in the position occupied by the translucent portion in the FIG. 4 orientation to block out sunlight directed as indicated by the arrows SL.

It is also noted that the greenhouse cylinder can be oriented with the opaque portion presented toward a wind. Thus, as shown in FIG. 4, if a cold wind is moving from left to right in FIG. 4 as indicated by arrows W, the insulation can be oriented to protect the greenhouse interior.

The cylinder can be counterweighted if desired so that proper rotation thereof is ensured.

Alternatively, the greenhouse cylinder can be rotated so that either the opaque or the translucent portion is presented upwardly, that is extending from the 9:00 position to the 3:00 position, to either completely close or completely open the greenhouse to sunlight.

Other orientations are possible and will occur to those skilled in the art from this description.

It is also noted that the greenhouse cylinder can be revolved to remove snow and thus prevent damage thereto from snowloading. The greenhouse cylinder can be revolved to present the insulation upwardly during hailstorms or very heavy rainstorms to prevent damage to the translucent section. The insulation can also be moved into an upward orientation when unwarranted heat loss from the greenhouse may occur. The insulation portion of the cylinder can also be revolved to be exposed at night to protect the translucent section from vandalism. The insulation section in such an embodiment would, of course, be composed of tough, shatter-resistant or shatterproof materials. Other situations can be visualized and the just-mentioned situations are examples only.

An alternative embodiment of the greenhouse is shown in FIGS. 6-8 and is indicated by the reference numeral 10'. The foundation, liner and drive mechanisms for greenhouse 10' are the same as for greenhouse 10, and will not be discussed. The greenhouse 10' includes a pair of concentric inner and outer cylinders 200 and 202, respectively, each of which can include an opaque and a translucent portion as in greenhouse 10. These portions can extend for 180° or any other arcuate extent about the cylinders of the greenhouses 10 or 10'. In other embodiments, both cylinders do not include opaque portions. One cylinder could contain an opaque surface, and the other cylinder could contain a shade screen, polarized material or no material at all.

The inner cylinder can have opaque portions and translucent portions corresponding to those on the outer cylinder or which differ therefrom. For example, the translucent portions of both cylinders can be polarizing type materials so that by rotating the cylinders relative to each other, more light is passed or prevented from entering the cylinder interior. Other combinations can also be used as will occur to those skilled in the art from this disclosure. All of the cylinders in both the single and dual cylinder embodiments shield the interior areas from direct spring sun because of the opaque portions.

The benches and walkway of the greenhouse 10' are supported in a manner similar to that shown in FIG. 2 wherein bars 44 are mounted on footings 112 and are buried to be essentially immobile. A pair of support beams 210 and 212 depend from the undersurface 214 of each bench, and the walkway is fixed to these beams at the longitudinal side edges thereof as shown in FIG. 6. A triangular wheel mount 220 is fixed to the lower ends of each beam and includes a pair of facing plates 222 and 224 connected together by end plates 226 and 228. The wheel mount is an arcuate triangle with the lower leg thereof arcuate in shape to match the curvature of the inner cylinder 200. Opposite wheel mounts extend toward each other as shown in FIG. 6. It is noted that there are a plurality of pairs of wheel mounts with each pair corresponding to the wheel sets shown in FIGS. 3 and 4.

A guide track defining rim 230 is mounted on inner surface 232 of inner cylinder 200. As best shown in FIG. 8, the rim is a dual C-shape with C-shaped channels 236 and 238 mounted together and to inner surface 232. A plurality of tandem wheels 240 and 242 are mounted by aligned axles 246 to the plates of the wheel mount and are accommodated in the trackways defined by the C-shaped channels. Each wheel shown in FIG. 7 has a corresponding wheel on the other side of the trackway rim.

As shown in FIG. 8, the inner cylinder is supported by the wheels 240 and 242 from the bench structure and is thus suspended by the wheel mount structures. The inner cylinder can be rotated independently of the outer cylinder by hand or by a separate motor mechanism as suitable.

The outer cylinder rests on support rollers 120 as in the first embodiment shown in FIGS. 1-5. It is noted that the roller axle can be supported by a special ledge as in FIG. 5 or merely supported on the liner as in FIG. 8 in either embodiment. A gap 250 is defined between the two cylinders and thus a dead air space is located between the two concentric cylinders. This dead air space can serve to insulate the greenhouse 10'.

The inner cylinder 200 can include an open area corresponding to the translucent area in cylinder 12. In such an embodiment, the inner cylinder will be only a "half-cylinder". The remaining portion of such a "half-cylinder" can be dark, or opaque, as suitable, but the preferred embodiment includes a darkened portion rather than an opaque portion.

Using concentric cylinders, many combinations are possible, especially if the inner cylinder is a "half-cylinder". Examples of possible orientations are shown in FIGS. 10A through 10G, and are discussed below. These orientations are examples, and are not intended as limitations.

Figure 10A:
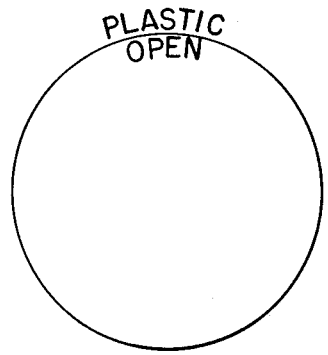
FIG. 10 is a schematic showing the various configurations of the FIG. 6 greenhouse.
Figure 10E:
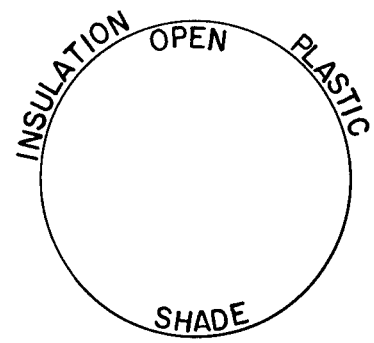
Figure 10B:
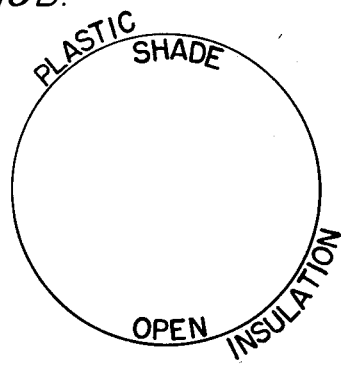

A grower in the north could select a position such as shown in FIG. 10A for a summer morning, and by noon shift to a position shown in FIG. 10B. If growing Mums, such a grower would select a position shown in FIG. 10C to get photoperiodism at 5:00 a.m., and at 8:00 a.m. would move back to a position such as shown in FIG. 10E.

Figure 10F:
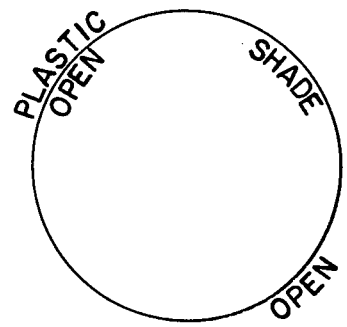
Figure 10C:
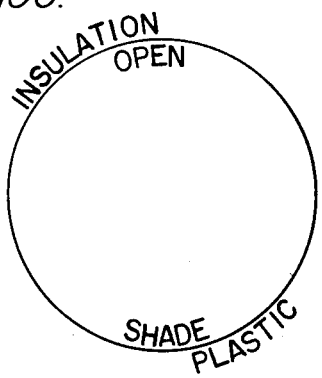
Figure 10G:
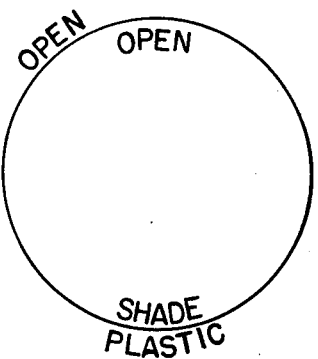
Figure 10D:
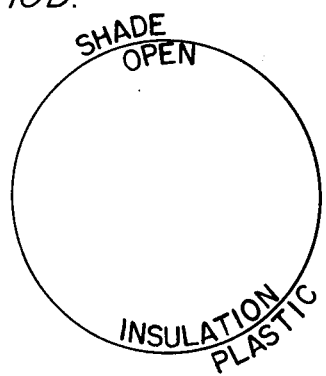

A position shown in FIG. 10D could be used by a grower in a southern area wanting shade for summer conditions. If the need arose for photoperiodism, such a grower would change the cylinder from merely darkened to opaque for complete darkness.

A combination of positions as in FIGS. 10F and 10G would be used by a grower in the south needing no photoperiodism. Such a grower could position the cylinder as in FIG. 10F using a plastic covering to protect from winds.

If a grower in the south was threatened by rain, such a grower could deploy a plastic covering at the top in FIGS. 10F and 10G for preventing rain from hitting blossoms and causing botrytis.

A grower could select the combinations of positions for his area of the country and crops which are being grown within the greenhouse. It is thus possible to change or add positions, opaque sections, translucent sections, or open sections as the need arises.

Another embodiment of the greenhouse 10' is shown in FIG. 9. The embodiment of the greenhouse 10' indicated in FIG. 9 includes an inner cylinder 200 and a concentric outer cylinder 202 separated therefrom by a gap 250. As shown in FIG. 9, a coupling 252 includes an outer track 260 positioned on outer surface 262 of the outer cylinder 202 and having a guide groove 264 defined therein. The idler or drive wheels 120 are accommodated in the groove 264. A roller support 268 is mounted on inner surface 270 of the outer cylinder and is fastened to the outer track 260 by a fastener 272 extending through a hole 274 defined in the outer cylinder. A roller 278 is pivotally supported in the roller support 268 by an axle 280 and extends toward the inner cylinder 200.

A roller guide 284 is mounted on outer surface 288 of the inner cylinder 200 which has a guide groove 290 defined therein to accommodate the roller 278. The guide 284 is coupled to the inner cylinder by a fastening means 294 which includes a washer 296 seated on inner surface 288 of the inner cylinder, and a bolt 300 extending through a hole 302 defined in the inner cylinder.

The inner cylinder thus is supported on the outer cylinder by the coupling 252 and the outer cylinder is supported by the wheels 120. The inner cylinder rides on the rollers 278 which are mounted in ribs formed by the guide tracks 260 which encircle the outer cylinder. The inner cylinder of the FIG. 9 embodiment can be rotated by hand or by driving mechanisms as in the other embodiments of the greenhouse. As in the FIG. 1 embodiment, the benches and walkway can be supported on the inner cylinder by rollers to move independently of the two independently movable cylinders.

The inner cylinders in FIGS. 6–9 embodiments can also be counterweighted if so desired to ensure proper rotation of all cylinders.

The greenhouse cylinders disclosed hereinabove can also be located on top of a building. Thus, such rooftop greenhouses can be mounted on standards or the like, without requiring a pit or the like. The weight of such greenhouses can be distributed via the standards to building walls, or other support means such as special pylons or the like. Special access elevators, stairways or the like can be used if desired.

One embodiment of such a rooftop greenhouse includes a plurality of axially aligned revolving cylinders placed side by side with other axially aligned revolving cylinders on the top of a roof. An access means, such as an outside elevator leading to an enclosed walkway, can be situated between aligned cylinders and coupled to the access doorway defined in each cylinder.

Such rooftop greenhouses can be used by condominium or apartment owners to provide individual greenhouses. Such rooftop greenhouses can also be used as a storehouse by florists or other such merchants for holding houseplants. Office buildings can exchange and recoorperate foilage plants from offices and hallways or other such areas using such rooftop greenhouses.

Examples of cylinder sizes are given below for several embodiments.

| Dia. | Circumference | Growing Surface/ Ln. Ft. | Cubic Ft. of Air/ Ln. Ft. | Ratio Skin:Sq.Ft. Growing Area | Ratio Cu.Ft. Air: Sq.Ft. Growing |
|---|---|---|---|---|---|
| 17' | 53.38 | 14 | 256.86 | 3.81 | 18.35 |
| 15' | 47.10 | 11 | 206.63 | 4.28 | 18.78 |
| 10' | 31.40 | 8 | 98.50 | 3.92 | 12.31 |
| 9' | 30.60 | 7 | 81.09 | 4.37 | 11.58 |

In the preferred embodiment, the hoop supports are aluminum, steel or other suitable material; the translucent portion is Mylar, fiberglass, polyethylene film, plexiglass, shade cloth or the like; the opaque portion is styrafoam sandwiched between two layers of aluminum, polyurathane between aluminum or fiberglass layers, or any other combination that will resist weathering and retain insulation features and values under humid conditions. It is noted that sizes, materials and the like may vary depending on climate, grower desires and the like.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A revolving greenhouse comprising:

a hollow outer cylinder revolvably mounted on a support means to have the longitudinal axis thereof horizontally oriented, said cylinder having a lateral surface;

translucent means forming a first portion of said cylinder lateral surface and opaque means forming the remainder of said cylinder lateral surface;

bench means in said cylinder extending longitudinally thereof, for supporting plants or the like in said cylinder;

roller means supporting said bench means on said cylinder;

a walkway extending longitudinally of said cylinder near said bench means;

cylinder revolving means for revolving said cylinder about said longitudinal axis for exposing said translucent and said opaque means to sunlight, said revolving means including idler rollers contacting said cylinder lateral surface, drive rollers contacting said cylinder lateral surface and drive means connected to said drive rollers for driving same to revolve said cylinder.

2. The revolving greenhouse defined in claim 1 further including a pair of cylinder end closure means.

3. The revolving greenhouse defined in claim 2 wherein said end closure means includes an access door in one of said end closure means.

4. The revolving greenhouse defined in claim 3 wherein said translucent means includes a plurality of translucent sections supported by said hoop supports.

5. The revolving greenhouse defined in claim 4 wherein said opaque means includes insulation material.

6. The revolving greenhouse defined in claim 1 further including a liner partially surrounding said cylinder.

7. The revolving greenhouse defined in claim 6 further including a drain means in said liner.

8. The revolving greenhouse defined in claim 1 wherein said support means includes the ground.

9. The revolving greenhouse defined in claim 1 further including a hollow inner cylinder concentric within said hollow cylinder.

10. The revolving greenhouse defined in claim 9 further including a circular track means mounted on said inner cylinder to extend circumferentially around the inner surface of said inner cylinder and around the axis of rotation of said cylinder, guide wheels mounted in said track means, a wheel mount fixed to said wheels and connecting said wheels to said bench means, whereby as said cylinder rotates, said bench means remains essentially stationary.

11. The revolving greenhouse defined in claim 10 wherein said bench means is fixed to said support means and said inner cylinder is suspended from said bench means.

12. The revolving greenhouse defined in claim 9 further including a coupling, said coupling including a first track on the outer surface of said outer cylinder, a roller mount fixed to the inner surface of said outer cylinder, a roller rotatably mounted in said roller mount, a second track fixed to the outer surface of said inner cylinder and receiving said roller.

13. The revolving greenhouse defined in claim 7 wherein said liner comprises concrete and has a base and a pair of sides diverging outwardly from said base.

14. The revolving greenhouse defined in claim 9 including means spacing said inner cylinder from said outer cylinder to define a dead air space.

15. The revolving greenhouse defined in claim 1 wherein said bench and walkway means are mounted on wheels which are oriented to roll circumferentially with respect to said outer cylinder for movement within said outer cylinder, whereby as said outer cylinder rotates, said bench means remains essentially stationary.

16. The revolving greenhouse defined in claim 15 further including a track on said outer cylinder inside surface on which said bench wheels move.

* * * * *